United States Patent Office 2,918,243
Patented Dec. 22, 1959

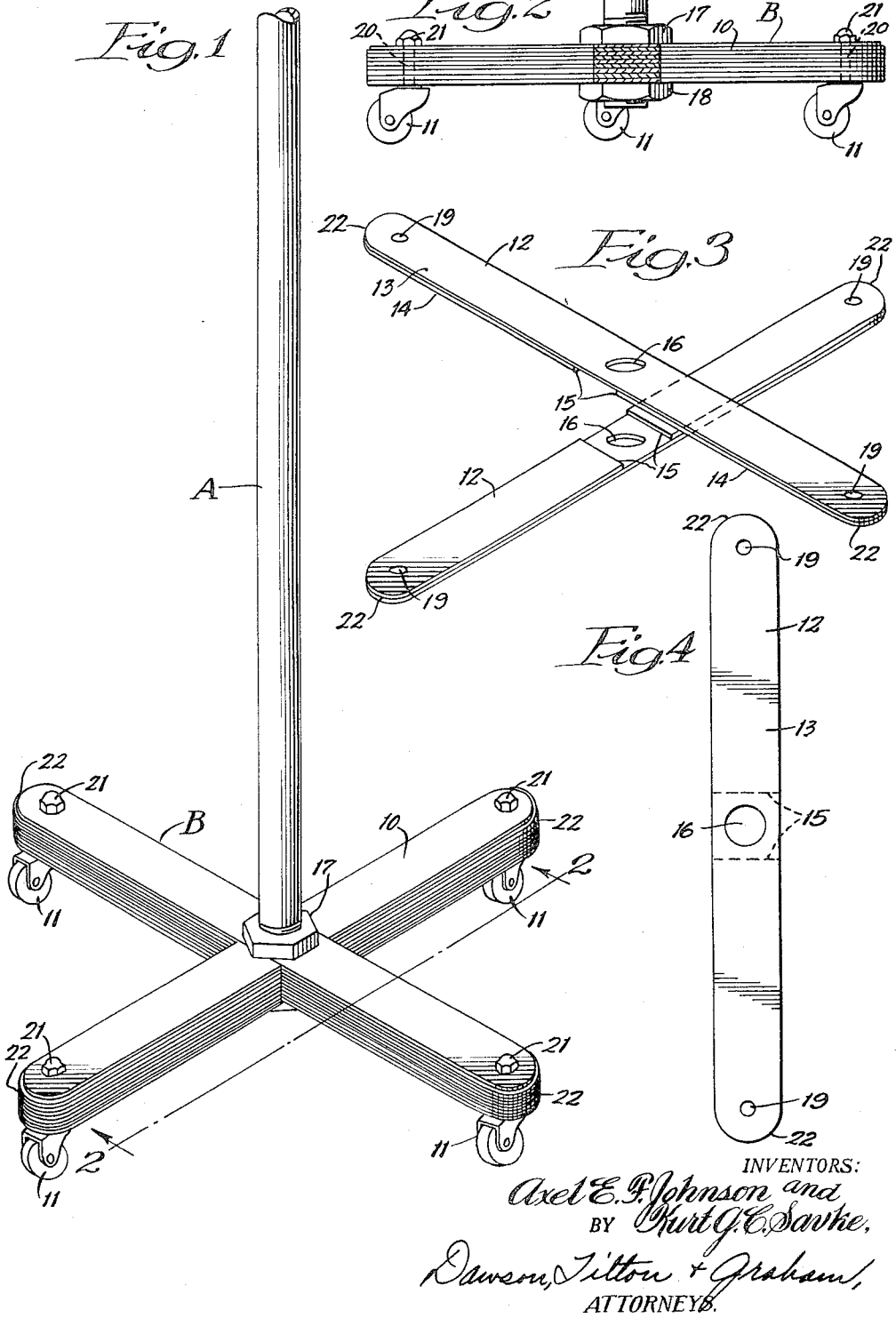

2,918,243

STANDARD SUPPORT STRUCTURE

Axel E. F. Johnson and Kurt G. C. Savke, Cincinnati, Ohio, assignors to American Hospital Supply Corporation, Evanston, Ill., a corporation of Illinois Application June 28, 1956, Serial No. 594,429

5 Claims. (Cl. 248—194)

This invention relates to standard support structures, and more specifically to a support base composed of a plurality of basic components laminated together to provide a suitable support for a standard, the number of such components being dependent upon the intended use or uses of the particular standard.

It is well known that standards are commonly used in hospitals, clinics and the like, for supporting containers of parenteral solutions, plasma, or blood, or for supporting light fixtures and other equipment. Generally, the bases for supporting such standards are formed from metal or wood, and are weighted with a relatively heavy material such as cast iron. Expenses and difficulties of production have heretofore prevented the manufacture of standard support bases tailored to suit a particular use or need, so that such bases are generally of uniform size, strength and weight. Consequently, for some uses, conventional standard support structures are unnecessarily heavy and bulky, while for other uses such bases lack sufficient strength and weight.

One of the principal objects of the present invention, therefore, is to overcome the aforementioned defects and disadvantages of present standard support structures. Another object is to provide a standard support structure composed of a selected number of component parts providing a base having the desired characteristics of strength, size and weight. A further object is to provide standard support bases composed of laminated vertically aligned members, the size, strength and weight of the bases being governed by the number of such laminated members. A still further object is to provide a standard support base formed of laminated steel strips, the base being particularly sturdy for its size because of its laminated steel construction, and being attractive in appearance.

Other objects will appear from the specification and drawings, in which

Figure 1 is a broken perspective view of a standard support structure embodying the present invention; Figure 2 is a broken sectional view taken along lines 2—2 of Figure 1; Figure 3 is a perspective view showing an interlocking pair of laminated members; and Figure 4 is a top plan view of one of the members shown in Figure 3.

Referring to the drawings, the structure shown in Figure 1 essentially comprises a standard indicated by the letter A, and a base generally represented by the letter B. The vertical standard is preferably in the form of a cylindrical tube or post, and is provided at its upper end (not shown) with means for holding containers for parenteral solutions, plasma, or blood, or for supporting light fixtures or other equipment. At its lower end, the post is connected to standard support base B. The base has four legs which extend outwardly at right angles from each other, and which are preferably equipped with casters 11 adjacent the outer ends thereof.

As shown best in Figure 3, the base is composed of a plurality of elongated members 12 arranged in interlocked pairs. Each of the members comprises a straight, elongated strip 13 of steel or other material having uniform width and thickness, and a pair of shorter steel strips 14 laminated upon one side of the larger elongated strip. Strips 14 are of the same width and thickness as strips 13, but are of a length which is equal to half the length of the long strips 13 less one-half the width of those strips. Each pair of short strips 14 are spot-welded, tack-welded or riveted upon one side of a full-length strip 13 so that the end and side edges of the short strips are flush with the respective end and side edges of the full-length strip. When strips 13 and 14 are laminated in this fashion, each of the elongated members 12 is provided with a square recess or slot 15 along one side and intermediate the ends thereof.

Since the width and depth of the central recesses 15 correspond with the width and thickness of the full-length strips 13, it is apparent that a pair of identical members 12 may be securely interlocked with each other. This is accomplished by simply arranging a pair of the members with their central recessed portions in facing relation, and with the leg portions of one member extending at right angles to the leg portions of the other member. Consequently, the recess provided by each member of the pair accommodates the central portion of the other pair, so that the upper and lower surfaces of the interlocked members are flush with each other. It is unnecessary to weld the contiguous central portions of the respective members of each pair, since these members are anchored together by other means which will now be described.

As illustrated most clearly in Figures 3 and 4, each of the elongated members 12 is provided with a central opening 16 through the recessed central portion thereof. Since openings 16 are located intermediate the ends of members 12, the openings of a pair of members are disposed in vertical alignment when the members are interlocked in crossed relation. Furthermore, when several pairs of identical interlocked members are stacked upon each other, the series of aligned openings 16 will provide a vertical passage through the center of the stacked or laminated pairs of crossed members. Through this passage projects the lower end of standard A, as indicated in Figures 1 and 2.

The lower end of the standard is threaded to receive a stop nut 17 and a securing nut 18. These nuts not only secure the standard to the laminated base, but also serve to clamp the stacked pairs of interlocked members tightly together. After the desired number of pairs of laminated members have been selected and placed in their proper respective positions to form the base, the lower end of standard A, upon which stop nut 17 has been threaded, is inserted through the passage defined by vertically aligned openings 16. Securing nut 18 is then threaded upon the extreme end portion of standard A, which projects through the passage or hole in base B.

Each of the laminated members 12 is provided with a pair of holes 19 adjacent opposite ends thereof. When a plurality of paired members are stacked with the respective leg portions thereof arranged in vertical alignment, the openings 19 of each member will be in register with corresponding openings of adjacent members, thereby providing vertical bores through the legs of the base. These bores receive the upstanding shafts 20 of casters 11. Preferably, the upper ends of shafts 20 are threaded and cap nuts 21 are threaded thereon to secure the casters upon base B. It will be noted that shafts 20 also aid in maintaining the adjacent leg portions of the laminated members in vertical alignment, and that cap nuts 21 and casters 11 along with nuts 17 and 18 connect the paired cross members to provide an integrated base unit.

Preferably, each of the members 12 has arcuate or curved end portions 22. The ends of each leg 10 of base B are therefore rounded to present a pleasing appearance and to prevent injury to persons, furniture, walls, etc. If desired, this rounded effect may be further increased by slightly reducing the length of the uppermost members, as shown best in Figures 1 and 2.

It is believed evident from the foregoing that base B may be formed from any desired number of paired cross members 12. The particular number of crossed members suitable for a given base depends upon the weight and strength requirements of that particular base, as determined by the intended use of the standard structure. For example, if the standard is expected to support heavy articles, then a relatively large number of paired cross members may be used in forming the standard support base. If, on the other hand, relatively light objects such as containers for parenteral solutions, plasma or blood, are to be carried by the standard, then a smaller number of paired cross members may be effective. The present invention, therefore, provides for the manufacture of standard support bases of varying weights and sizes, depending upon the intended uses of the standard support structures. Despite differences in size, weight and strength, the bases may be mass-produced from standard component parts, and may be manufactured without the necessity of complicated machinery "set-up" changes.

In addition, it is to be noted that standard support bases embodying the present invention are, by reason of their laminated steel construction, extremely sturdy in relation to their size. The present base structure avoids the bulk of cast iron weighted bases now in use, and at the same time is attractive in appearance and design.

While we have disclosed our invention in considerable detail for purposes of illustration, it will be understood by those skilled in the art that many of these details may be varied without departing from the spirit and scope of this invention.

We claim:

1. A standard support base comprising a plurality of superimposed pairs of interlocked elongated members, each of said members having a recessed portion intermediate the ends thereof, said members being arranged in pairs, the members of said pairs intersecting each other at right angles and having the recessed portions thereof snugly disposed in interlocking relation to prevent relative movement therebetween, said paired members having vertically aligned central openings therethrough for receiving and supporting a vertical standard, and connecting means adjacent the ends of said members for securing a selected number of paired members in a vertically aligned superimposed series for supporting said standard.

2. The structure of claim 1 in which said paired members of said superimposed series are provided with vertically aligned openings adjacent the ends thereof, said connecting means comprising roller structures having shafts extending upwardly through said vertically aligned openings, and means for maintaining said shafts within said openings and for securing adjacent members of said series together.

3. A standard support structure comprising a plurality of elongated members each having a pair of flat outwardly extending leg portions and having a recessed central portion, said members being arranged in a plurality of superimposed pairs, the members of each pair being arranged with the recessed central portions thereof in opposing interlocking relation and the leg portions of one member extending outwardly at right angles with reference to the leg portions of the other member, said paired interlocking members having flush top and bottom surfaces, said paired members also having vertically aligned central openings therethrough for receiving and supporting a vertical standard, and connecting means adjacent the ends of said members for securing a selected number of paired members in vertical alignment for supporting said standard with the flat leg portions of successive pairs in surface contact with each other.

4. A standard support base comprising a plurality of elongated members, said members being arranged in a plurality of stacked pairs, each of said members comprising a substantially flat elongated first strip having a pair of shorter and substantially flat second strips laminated upon one side thereof, each of said first strips being covered along one side thereof by said second strips except for an uncovered central portion intermediate the ends thereof, the members of each of said pairs being crossed and having the central portions thereof arranged in opposing interlocking relation, and means adjacent the ends of said members for securing a selected number of paired members in stacked surface-engaging relation and for supporting a vertical standard.

5. The structure of claim 3 in which said paired members of said superimposed series are provided with vertically aligned openings adjacent the ends thereof, said connecting means extending through said openings for clamping said members in vertical alignment.

References Cited in the file of this patent

UNITED STATES PATENTS

| 1,251,716 | Wanner | Jan. 1, 1918 |
| 1,282,600 | Lawlor | Oct. 22, 1918 |
| 2,048,608 | Holland | July 21, 1936 |
| 2,250,361 | Cullinan | July 22, 1941 |

FOREIGN PATENTS

| 10,429 | Great Britain | of 1884 |